(12) United States Patent
Lundquist et al.

(10) Patent No.: US 7,218,858 B1
(45) Date of Patent: May 15, 2007

(54) SYSTEM AND METHOD FOR USE OF A VARIABLE OPTICAL ATTENUATOR IN AN OPTICAL NETWORK

(75) Inventors: Paul M. Lundquist, San Jose, CA (US); Richard J. Frost, Cary, NC (US); Marc Levesque, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 736 days.

(21) Appl. No.: 10/153,230

(22) Filed: May 20, 2002

(51) Int. Cl.
*H04J 14/02* (2006.01)
*H04B 10/00* (2006.01)
*G02B 6/00* (2006.01)

(52) U.S. Cl. .................... 398/94; 398/158; 385/140
(58) Field of Classification Search .............. 398/9, 398/33, 38, 93, 120, 123, 94, 158, 42–43, 398/48, 58, 69, 79; 385/140, 31, 27
See application file for complete search history.

(56) References Cited

U.S. PATENT DOCUMENTS

| | | | |
|---|---|---|---|
| 4,751,378 A | | 6/1988 | Hinton et al. |
| 4,754,132 A | | 6/1988 | Hinton et al. |
| 5,768,231 A | * | 6/1998 | Sagata ............ 369/47.48 |
| 6,137,103 A | | 10/2000 | Giles et al. |
| 6,275,329 B1 | | 8/2001 | Sieben |
| 6,320,672 B1 | * | 11/2001 | Itoh ................ 358/1.9 |
| 6,549,107 B2 | * | 4/2003 | Lim et al. ........ 335/78 |
| 6,681,073 B2 | * | 1/2004 | Chan et al. ...... 385/140 |

OTHER PUBLICATIONS

Brankley, Andrew E., [Online]. "History of the Hard Drive, 1970 to Present", [retrieved on Aug. 6, 2002], Retrieved from the internet: <URL: http://moore.sac.on.ca/NORTHERNLYNX/ northern%20lynx/hdrive.htm. pp. 1-3.
Classic Hard Drives: the Red Hill Guide, [online] "Golden Oldies, Drives we used to love and hate". [retrieved on Aug. 6, 2002]. Retrieved from the internet: <URL: http://www.redhill.net.au/d-a. html. pp. 1-14.
Kozierok, Charles M., The PC Guide, [online]. "Servo Techniques and Operation". [retrieved on Aug. 6, 2002]. Copyright 1997-2001. Retrieved from the internet: <URL: http://www.pcguide.com/ref/ hdd/op/actServo-c.html. pp. 1-3.
Kozierok, Charles M., The PC Guide, [online]. "Head Actuator". [retrieved on Aug. 6, 2002]. Copyright 1997-2001. Retrieved from the internet: <URL: http://www.pcguide.com/ref/hdd/op/actActua- tor-c.html. pp. 1-4.
Motion Control Solutions, "Voice Coil Actuators—Who sells them and what are they good for?", [online]. [retrieved on Aug. 6, 2002]. Copyright 1998. Retrieved from the internet: <URL http://www. theproductfinder.com/actuator/voicoi.htm. p. 1-2.

* cited by examiner

*Primary Examiner*—Jason Chan
*Assistant Examiner*—Quan-Zhen Wang
(74) *Attorney, Agent, or Firm*—Clements Walker; Bradley D. Crose; Tyler S. Brown

(57) ABSTRACT

Described herein are one or more embodiments of a system and method for managing power in an optical network using a variable optical attenuator (VOA). In one embodiment, the attenuation of the VOA is controlled in a feedback loop in accordance with a plural zone method. In one example, the VOA is a mechanical VOA. In another example, the VOA is a latching VOA.

27 Claims, 6 Drawing Sheets

SYSTEM AND METHOD FOR USE OF A VARIABLE OPTICAL ATTENUATOR IN AN OPTICAL NETWORK

BACKGROUND

Field of Invention

The present invention relates to optical networks, in particular it relates to variable optical attenuators for power management in an optical network.

In an optical network such as a wavelength division multiplexed (WDM) network, optical signals travel different routing paths and have different power levels.

Optical attenuators are used in a network to improve its signal-to-noise performance. For example, by attenuating the power level of signals with higher power relative to other signals in an aggregate set, the large power differential between the different signals in the amplified signal can be reduced. Fixed attenuator devices such as passive attenuator devices (PADs) may be used. However, if changes occur in the network due for example, but not limited to, signal routing or switching events, the signal levels are not as anticipated when a manual configuration occurred. For example, if signal power levels change as a result of a network switching event, the fixed attenuator device cannot adjust its attenuation which may result in that network element not operating properly in accordance with the new signal power levels.

Different types of variable optical attenuators (VOAs) may be used. An example of a VOA that may be used is a mechanical VOA. However, mechanical VOAs having moving parts activated by motors are not typically suited to closed loop operation in which the attenuation is adjusted in accordance with feedback monitoring. Typically the lifetimes of VOA devices that include moving parts are the shortest. The preponderance of VOA's that have been implemented in telecommunications systems incorporate electrical motors, which invariably have very short lifetimes. Various designs include either stepper motors or linear motors that move graded index filters, neutral density filters, blocking armatures, or apertures into and out of the transmitted laser beam. Other designs use motors to bend fibers or modify alignment by adjusting the position of components inside the device. The motors used in these designs are incapable of continuous operation for periods approaching the requirements of telecommunications applications. Another category of VOA designs that are comprised of moving parts are micro-electromechanical (MEM) devices, which utilize MEM actuators to modify alignment, to tilt mirrors, to move a shutter or armature into and out of a transmitted beam, or to modify attenuation in other ways known to those of skill in the art. All MEM designs again have a finite lifetime and are not suitable for constant adjustment. Finally, many VOA designs that do not utilize moving parts do have finite lifetimes due to the electronics that are used to actuate the attenuation change. Any VOA design that offers a finite lifetime (relative to the time scales of telecommunications installations) are not suitable for closed loop operation.

Another type of VOA that may be used is one not having moving parts. One group of VOAs not having moving parts are typically known as fast VOAs. An example of such a VOA is one using a magnetic coil to rotate the polarization of an optical beam propagating through a magneto-optic crystal. Combined with the use of birefringent optics, the rotation of the polarization is used to attenuate the light. VOAs such as the fast VOAs require power to maintain their attenuation setting. When a failure occurs (e.g. a power failure) at a node affecting the control circuitry of a fast VOA, the wavelengths passed through from other nodes will not be properly attenuated. The power of these passed through signals may be too high or too low resulting in loss of traffic or receiver damage at the nodes where these signals are dropped.

It is desired to provide a system and method for managing power in an optical network using a VOA that can operate in a closed loop. Additionally, it is desired to provide a system and method for managing power in an optical network using a VOA that maintains its attenuation settings as a result of an electrical power failure occurring and that can operate in a feedback loop (or closed loop).

SUMMARY

The present invention overcomes the disadvantages of the prior art by providing one or more embodiments of a system and a method for managing power in an optical network comprising a variable optical attenuator being controlled in accordance with a plurality zone method in a feedback loop. In one embodiment, the VOA is a VOA having moving parts. In another embodiment, the VOA is a latching VOA. In one aspect, the latching VOA preserves the attenuation setting of a VOA during a failure causing the loss of electrical power to the control circuitry of the VOA.

DETAILED DESCRIPTION OF THE DRAWINGS

In one embodiment, a node in a telecommunications network is a data and telecommunications transport platform. Examples of activities which processing at a node may comprise include routing and add/drop multiplexing. One type of a node is an optical node that performs activities for processing the optical signals received, transmitted, and passed through at the node. A node may be embodied as a collection of cards or circuit packs communicatively coupled via a backplane. Those of skill in the art will appreciate that the invention may be embodied in a node in a network in one of various network topologies, examples of which are ring, point-to-point, and mesh topologies.

Figure 1:
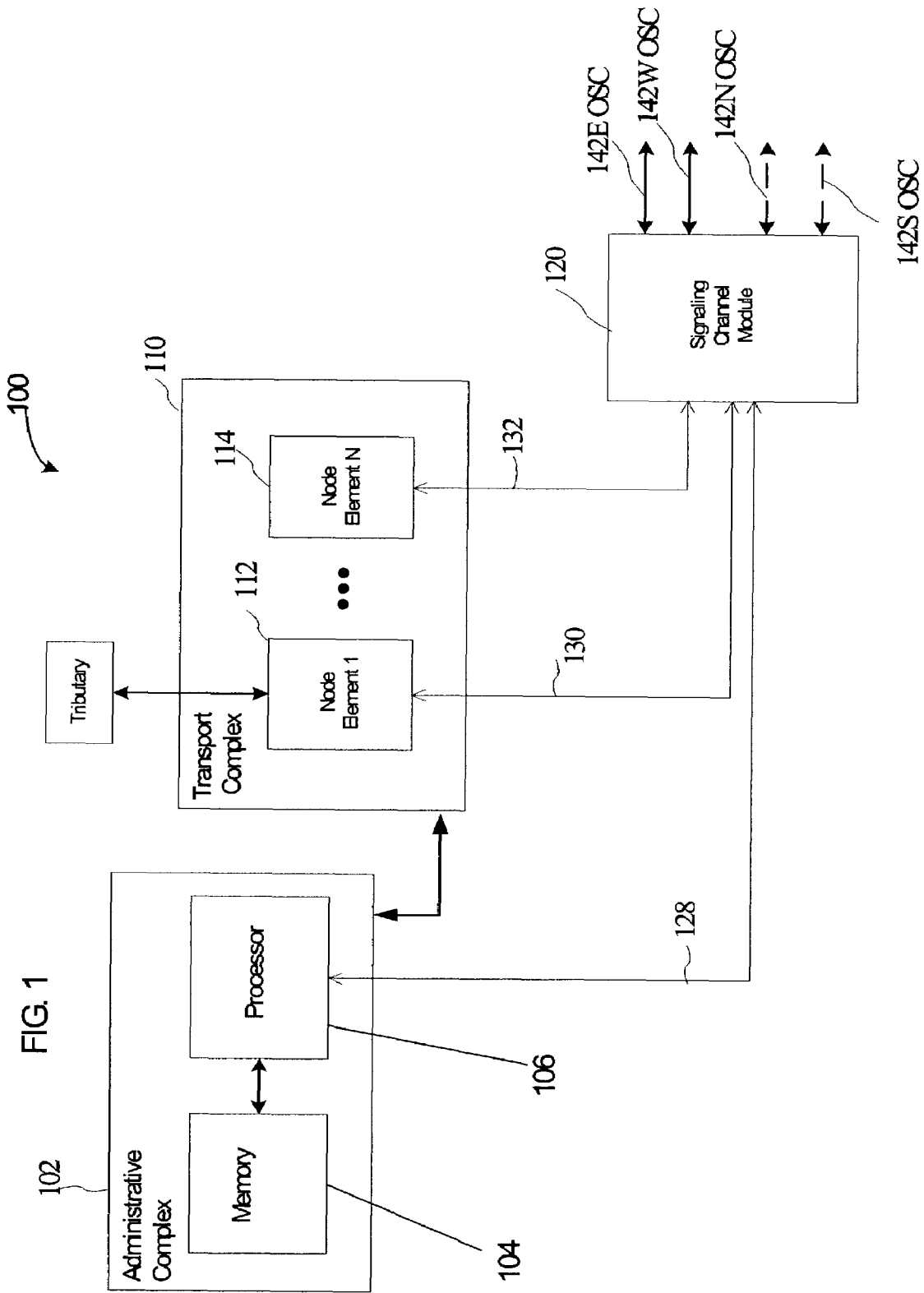
FIG. 1 illustrates a node in an optical communications network in accordance with an embodiment of the invention.

FIG. 1 illustrates a node 100 which may be located in an optical communications network in accordance with an embodiment of the invention. In this particular embodiment, the node comprises an administrative complex 102, a transport complex 110, and a signaling channel module 120.

The administrative complex 102 is primarily concerned with management of the node and system related management functions. Examples of administrative node functions are node configuration, provisioning, providing a management interface to the customer, retrieving and indicating failure conditions through alarms. In other words, the administrative complex performs functions related to the operation, administration, maintenance, and provisioning (OAM&P) of the node. The administrative complex comprises a memory 104 and a processor module 106 having an intra-nodal communication link 128 to the signaling channel module 120.

The signaling channel module 120 processes an optical supervisory channel (OSC) 142W, 142E, 142N, 142S which carries administrative information between nodes in the network. For example, the OSC may carry information indicating a link failure in the network. Furthermore, if an OSC is not received at a node, the non-receipt indicates a failure in a link to an adjacent node or a failure in the adjacent node or the recipient node itself. In the embodiment shown, for each link, there is an OSC. For example, in a two fiber ring configuration, there is an OSC for each fiber, 142W and 142E. In a mesh configuration example with four fiber links, there is an OSC 142W, 142E, 142N, 142S for each fiber link. The OSC may be embodied as a separate wavelength from payload signals. In another embodiment, it may be time division multiplexed or subcarrier multiplexed onto the payload wavelengths.

The transport complex 110 comprises a collection of node element modules 112, 114 in the system that perform traffic-carrying functions with respect to the optical communications traffic. The node element modules 112, 114 may comprise optical filters, switches, amplifiers, attenuators, transmitters and receivers. In this embodiment, each of the node element modules in the transport complex has a communication link 130, 132 to the signaling channel module 120.

Figure 2:
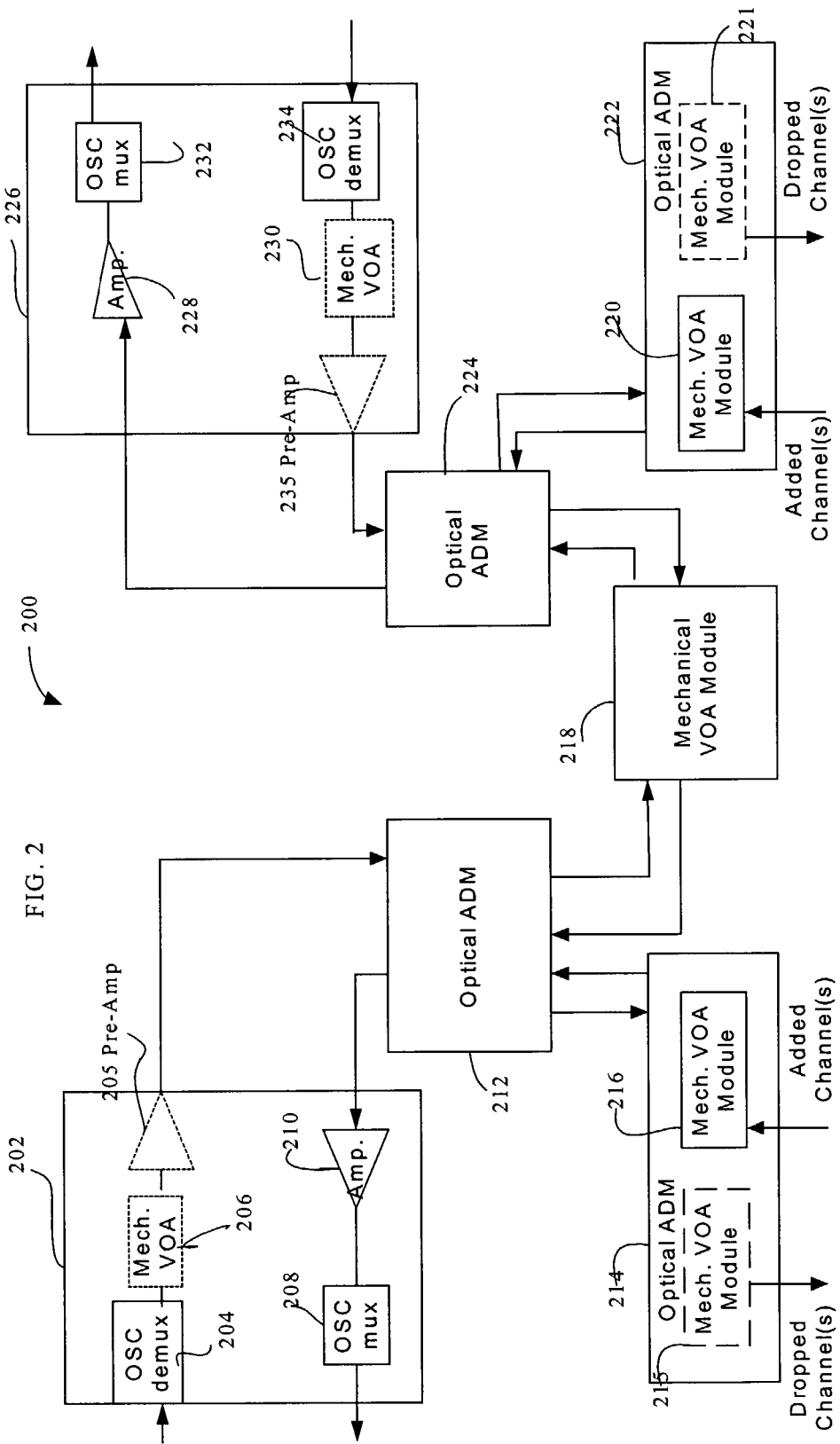
FIG. 2 illustrates a node in an optical network having a unidirectional path switched ring (UPSR) configuration in accordance with an embodiment of the invention.

FIG. 2 illustrates a node 200 in an optical network having a unidirectional path switched ring (UPSR) configuration in accordance with an embodiment of the invention. Other unidirectional path switched topologies such as mesh and point-to-point may also be used. The discussion below applies to both directions of traffic. A wavelength division multiplexed (WDM) signal is received by an optical line module 202. The optical line module 202 comprises an OSC demultiplexer 204, an amplifier 210, and an OSC multiplexer 208. The OSC channel for the link is demultiplexed by the OSC demultiplexer 204 and sent to the signaling channel module 120 for processing. The rest of the WDM signal is forwarded in this example to an optical add-drop multiplexer (OADM) 212 which demultiplexes one or more wavelengths from the WDM signal. These dropped one or more wavelengths, in this embodiment, are sent to another OADM 214 for further demultiplexing of the one or more dropped wavelengths. The power of the one or more dropped signals may be adjusted with an optional mechanical VOA module 215. An optional mechanical VOA 206 may be inserted after the OSC filter if a pre-amplifier 205 is inserted in the path between the OSC demultiplexer 204 and the optical add-drop multiplexer 212.

In this embodiment, the OADM 212 passes through one or more wavelengths as well to a mechanical VOA module or unit 218. This module comprises a VOA for each direction of traffic. The discussion below applies to both directions of traffic. Additionally, a separate VOA may be used for each one of groups of wavelengths in the passed through signals or for each one of groups of power divided signals in the passed through signals. The mechanical VOA module attenuates the one or more signals in the passed through wavelengths to even out any power differentials between passed through signals. Another OADM 222 multiplexes individual wavelengths and forwards them to a mechanical VOA unit 220. This VOA unit 220 attenuates the signals to be added to the passed through signals by OADM 224. From the OADM 224, the multiplexed signals are forwarded to amplifier 228. Amplifier 228 may be an erbium doped fiber amplifier (EDFA). An OSC multiplexer 232 multiplexes the OSC modulated with information from the signaling channel module 120 into the WDM signal before the signal is sent back to the network.

Figure 3:
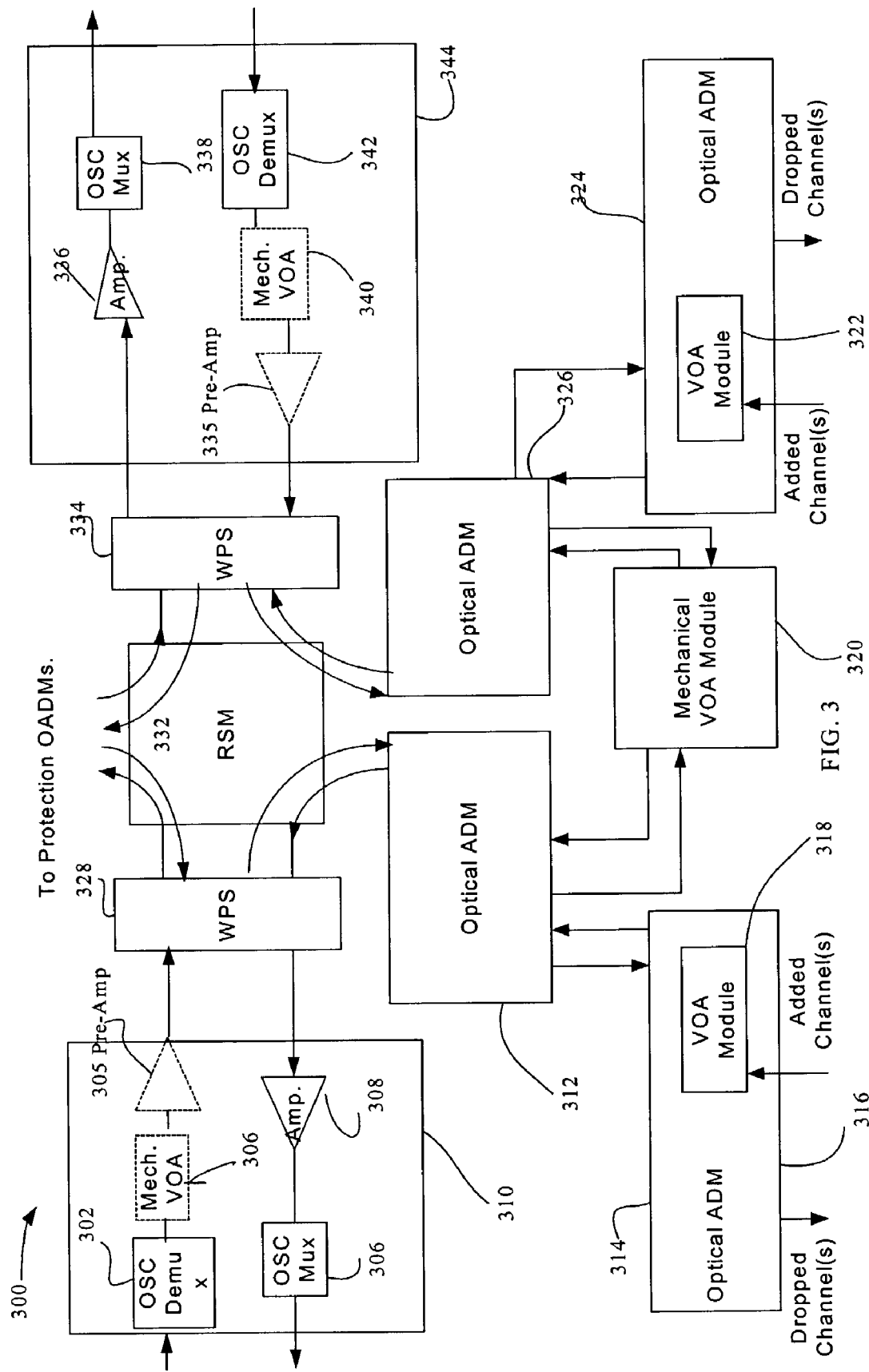
FIG. 3 illustrates a node in an optical network having a bi-directional line switched ring (BLSR) configuration in accordance with an embodiment of the invention.

FIG. 3 illustrates a node in an optical network having a bi-directional line switched ring (BLSR) configuration in accordance with an embodiment of the invention. Other bi-directional line switched topologies such as mesh and point-to-point may also be used. The following discussion below applies to both directions of traffic in FIG. 3. A wavelength division multiplexed (WDM) signal is received by an optical line module 310. The optical line module 310 comprises an OSC demultiplexer 302, an amplifier 308, and an OSC multiplexer 306. The OSC channel for the link is demultiplexed by the OSC demultiplexer 302 and sent to the signaling channel module 120 for processing.

The rest of the WDM signal is forwarded in this embodiment to a working protection splitter (WPS) 328 which is an optical filter for separating wavelengths designated as working from wavelengths designated as protection wavelengths. From the WPS 328, both sets of wavelengths are forwarded to a ring switch module (RSM) 332. The protection wavelengths that may be in use during normal operation for carrying lower priority data are forwarded to a similar arrangement of OADMs and VOA units in a protection side of the node similar to the embodiment of an arrangement of OADMs and VOA units as discussed below for the working wavelengths. If there are no protection wavelengths in use in the system during normal operation, there does not need to be a protection side of the node with an arrangement of OADMs and VOA units. The working wavelengths are forwarded by the RSM 332 to an optical add-drop multiplexer (OADM) 312 which demultiplexes one or more wavelengths from the WDM signal. These dropped one or more wavelengths, in this embodiment, are sent to another OADM 314 for further demultiplexing of the one or more dropped wavelengths. An optional mechanical VOA 306 may be inserted after the OSC demultiplexer 304 if a pre-amplifier 305 is inserted in the path between the OSC demultiplexer 304 and the optical add-drop multiplexer 312.

In this embodiment, the OADM 312 passes through one or more wavelengths as well to a mechanical VOA module or unit 320. This module comprises a VOA for each direction of traffic. The discussion below applies to both directions of traffic. Additionally, a separate VOA may be used for each one of groups of wavelengths in the passed through signals or for each one of groups of power divided signals in the passed through signals. The mechanical VOA module attenuates the one or more signals in the passed through wavelengths to even out any power differentials between passed through signals, and to maintain the power budget for the node or the network. Another OADM 324 multiplexes individual wavelengths and forwards them to a VOA unit 322. This VOA unit 322 attenuates the signals to be added by OADM 324. In this BLSR configuration example, this VOA unit is a non-mechanical VOA unit such as a fast VOA.

OADM 326 adds the multiplexed signals from OADM 324 to the passed through signals. From the OADM 326, the multiplexed signals are forwarded to the RSM 332 which passes them to WPS 334. WPS 334 combines the multiplexed working channels with any protection channels that may be in use. The combined signal is then forwarded to amplifier 336. Amplifier 336 may be an erbium doped fiber amplifier (EDFA). An OSC multiplexer 338 multiplexes the OSC modulated with information from the signaling channel module 120 into the WDM signal before the signal is sent back to the network.

One benefit of using a latching VOA is that its attenuation settings remain fixed in the event of a failure, an example of which is a loss of electrical power. For example, a stepper motor may be used to move an optical attenuation element to a certain position. If the power is lost, the element remains in that position. As illustrated in the node embodiments above, this is particularly beneficial for the passed through wavelengths or channels because the downstream nodes where the traffic is dropped may continue to function although this particular node has lost electrical power.

Figure 4:
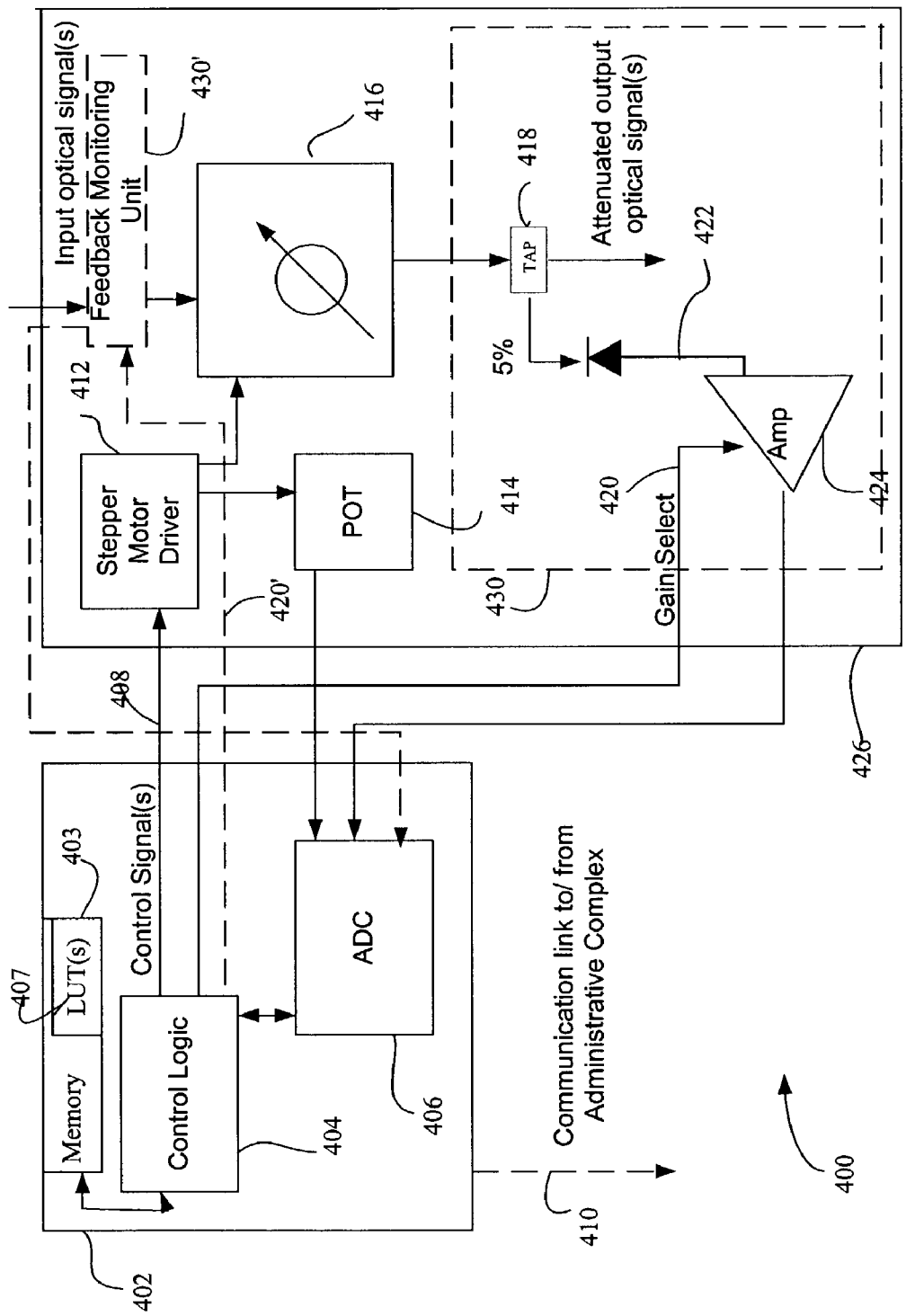
FIG. 4 illustrates a system for managing power in an optical network using a VOA in accordance with an embodiment of the invention.

FIG. 4 illustrates a system 400 for managing power in an optical network using a VOA in accordance with an embodiment of the invention. In this embodiment, the VOA is a latching mechanical VOA. The illustrated embodiment comprises two units: a control unit 402 and a VOA block 426. As per the discussion of the node embodiments in FIGS. 2 and 3 above, optical signals may be received from different directions through the node. For each direction, there may be one VOA block. In one embodiment, the control unit 402 may provide control for each VOA attenuating signals for a different direction. In another embodiment, each VOA block may have its own control unit. In another embodiment, one or more of the elements of the VOA block may be under the control of a control unit at another node in the network.

In the illustrated embodiment, the control unit 402 is communicatively coupled 410 to the processor 106 in the administrative complex 102. Through this communication coupling (e.g. through a backplane connecting circuit packs), the control unit receives data indicating events such as a link failure or a system upgrade. The control unit 402 includes control logic 404, a memory 403 and an analog to digital converter 406. The control logic 404 may be embodied as a processor executing software instructions, a programmable logic device (PLD) or a combination of these. The memory 403 includes one or more lookup tables 407. In this embodiment, one of the lookup tables 407 includes an attenuation value for the VOA for achieving a target output power as predetermined for the system or as updated by the control unit based on notification of an event from the administrative complex 102. Examples of events include a link failure or a change in the number of channels. The memory 403 may also store attenuation settings such as upper and lower limits for an adjustment unit, for example a motor.

The VOA block 426 comprises an attenuation adjustment unit 412 for adjusting the attenuation of an optical attenuation element 416. In this example, the attenuation adjustment unit 412 is a stepper motor 412 for adjusting the position of the attenuation element 416 in accordance with control signals 408 from the control unit 404. The VOA block 426 further comprises an attenuation setting detector 414. In this example, the attenuation setting detector is a potentiometer 414. The potentiometer indicates the current attenuation setting as a position in which the stepper motor 412 has placed the optical attenuation element 416. In this example, the potentiometer 414 is mechanically linked to the stepper motor 412, and it provides a voltage indicating the position of the optical attenuation element 416 by communicating a wiper voltage to the ADC 406 of the control unit 402. The converter 406 forwards the digitally converted signals to the control logic 404. The wiper voltage from the potentiometer is monitored to determine if it is within a lower limit and an upper limit. If the voltage reaches either of these limits, the control logic 404 ceases stepping of the motor to avoid permanent damage to one or more of the elements of the VOA block 426. Typically, an alert to the administrative complex 102 is sent for notification to user. If the signal from the attenuation detector 414 is safely between the upper and lower limits, the adjustment unit 412 adjusts in response to a closed feedback loop. In the illustrated example, the motor 412 is stepped up or down accordingly.

The VOA block 426 further comprises a feedback monitoring unit 430 comprising an optical tap coupler 418 for tapping off a portion of the attenuated optical signal, a photodetector 422 for converting the portion to an electrical signal representing the output power of the attenuated signal, and a transimpedance gain amplifier 424 for amplifying the output signal from the photodetector 422 in accordance with gain select control signals 420 set by the control logic 404. A second feedback monitoring unit 430' may also be located on the input side of the optical attenuation element 416. The output of this feedback unit is one or more input values representing one or more power levels of the input optical signals. These one or more input values are forwarded to the ADC 406. In one embodiment, the control unit uses the one or more input values and/or an output attenuation value from the feedback unit that processes the one or more signals output by the element 416 to determine or adjust the target attenuation value. An example of an attenuation value is a power level. Another example of an attenuation value is a difference of power such as may be measured in dB. The control logic 404 also provides gain select control signals 420' to this input feedback monitoring unit 430'. Those skilled in the art will appreciate in light of the teachings of this description that although the elements are depicted as individual units, any combination of the elements may also be implemented in one unit and still be within the scope of the claims.

In one embodiment, the optical attenuator element 416 is a neutral density filter that is moved by the stepper motor 412 in and out of the optical path in order to achieve variable attenuation. An example of such a VOA unit using this neutral density filter is a VCB series optical attenuator made by JDS Uniphase. In another embodiment, one or more optical attenuating elements may be positioned by MEM devices in accordance with control signals 408 from the control unit 404. The MEM actuators are utilized to modify alignment, to tilt mirrors, to move a shutter or armature into and out of a transmitted beam, or to modify attenuation in other ways known to those of skill in the art. Examples of other VOA designs include those using either stepper motors or linear motors as attenuation adjustment units that adjust by movement optical attenuation elements such as graded index filters, neutral density filters, blocking armatures, or apertures into and out of a transmitted laser beam. Other designs use motors to bend fibers or modify alignment by adjusting the position of components inside the device.

In this embodiment, the VOA unit has two modes of operation, a closed loop operation mode in which the attenuation value of the VOA is regulated through the use of feedback provided by one or more feedback monitoring units. The other mode is an open loop operation which may be used in the event of a ring switch or system reconfiguration. In this mode, the VOA is set to a fixed attenuation setting by either disabling the closed loop control or using a lookup table 407. The VOA stepper motors are then disabled until a new attenuation value is determined. Upon determination of the new value, the stepper motor is enabled, and the attenuation element (e.g. 416) is adjusted to achieve the new attenuation value.

Closed loop operation of a VOA is typically desired in order to maintain the desired target power of the attenuated signals. However, if no limit on the attenuation resolution is implemented in the control loop, an optical attenuation element is repeatedly adjusted once the VOA reaches the desired target attenuation value. This repeated adjustment will reduce the lifetime of the VOA devices and the driving circuits, and it will increase the electrical power consumption and the amount of heat generated.

Figure 5:
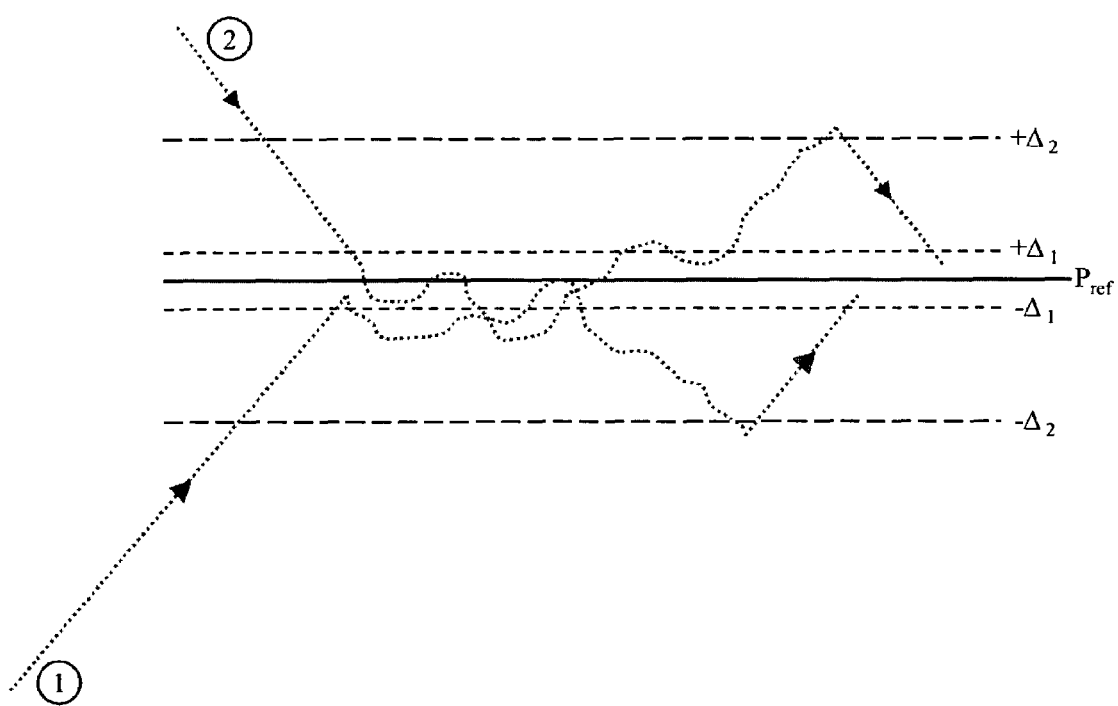
FIG. 5 illustrates deviation values or levels for plural zones around a target attenuation value for use with a method for managing power in an optical network in accordance with an embodiment of the invention.

FIG. 5 illustrates deviation values or levels for plural zones around a target attenuation value for use with a method for managing power in an optical network in accordance with an embodiment of the invention. In the embodiment below of a plural zone method, the target attenuation value is a target output power $P_{ref}$. In this example, there are two zones around the target output power, $P_{ref}$, however, more than two zones may be used. Zone 1 has boundaries at $P_{ref} \pm$ deviation value $\Delta_1$, and zone 2 has boundaries at $P_{ref} \pm$ deviation value $\Delta_2$, where $\Delta_1 < \Delta_2$. In another embodiment, the zones may be asymmetrical with respect to the target output power $P_{ref}$. An example of such asymmetrical zones could have zone 1 with boundaries $P_{ref} + \Delta_1$ and $P_{ref} - \Delta_1'$, and zone 2 with boundaries $P_{ref} + \Delta_2$ and $P_{ref} - \Delta_2'$, where $\Delta_1 < \Delta_2$, $\Delta_1' < \Delta_2'$, $\Delta_1 \neq \Delta_1'$, and $\Delta_2 \neq \Delta_2'$. Whenever the actual output power level is out of zone 2 meaning the absolute value of the output power level is greater than deviation value $\Delta_2$ from the target attenuation value, in this case the target output power, the VOA is adjusted. In case 1, the attenuation is decreased until the output power value of the VOA is up back within zone 1. In case 2, the attenuation is increased until the output power value of the VOA is down back within zone 1. It is desirable that the adjustment of the attenuation is performed to achieve an output attenuation value of the target output power. However, the accuracy of achieving the target output power may be adjusted according to system requirements. In this embodiment, when the power falls within zone 1, the VOA is disabled and is not reactivated until the output optical power drifts out of zone 2 again. Alternately, if the number of channels passing through the VOA is changed (by a ring switch or system upgrade, for example), then the above sequence commences after the new target output power $P_{ref}$ is computed. In this situation, $\Delta_1$ and $\Delta_2$ are unchanged, and the various zones are shifted higher or lower according to the shift in $P_{ref}$.

The boundaries of zone 1 and zone 2 are set based upon criteria such as the sufficient accuracy to be obtained while at the same time preventing continuous activation of the VOA adjustment unit, for example a stepper motor. The optimization of these values requires a tradeoff between the accuracy required by the system link budget, the longevity of the VOA devices, and the heat dissipated by them. An example of boundaries to be set could be $P_{ref} \pm 0.1$ dB for zone 1, and $P_{ref} \pm 0.5$ dB for zone 2. The final selection of these values should be performed after system level evaluation.

Figure 6:
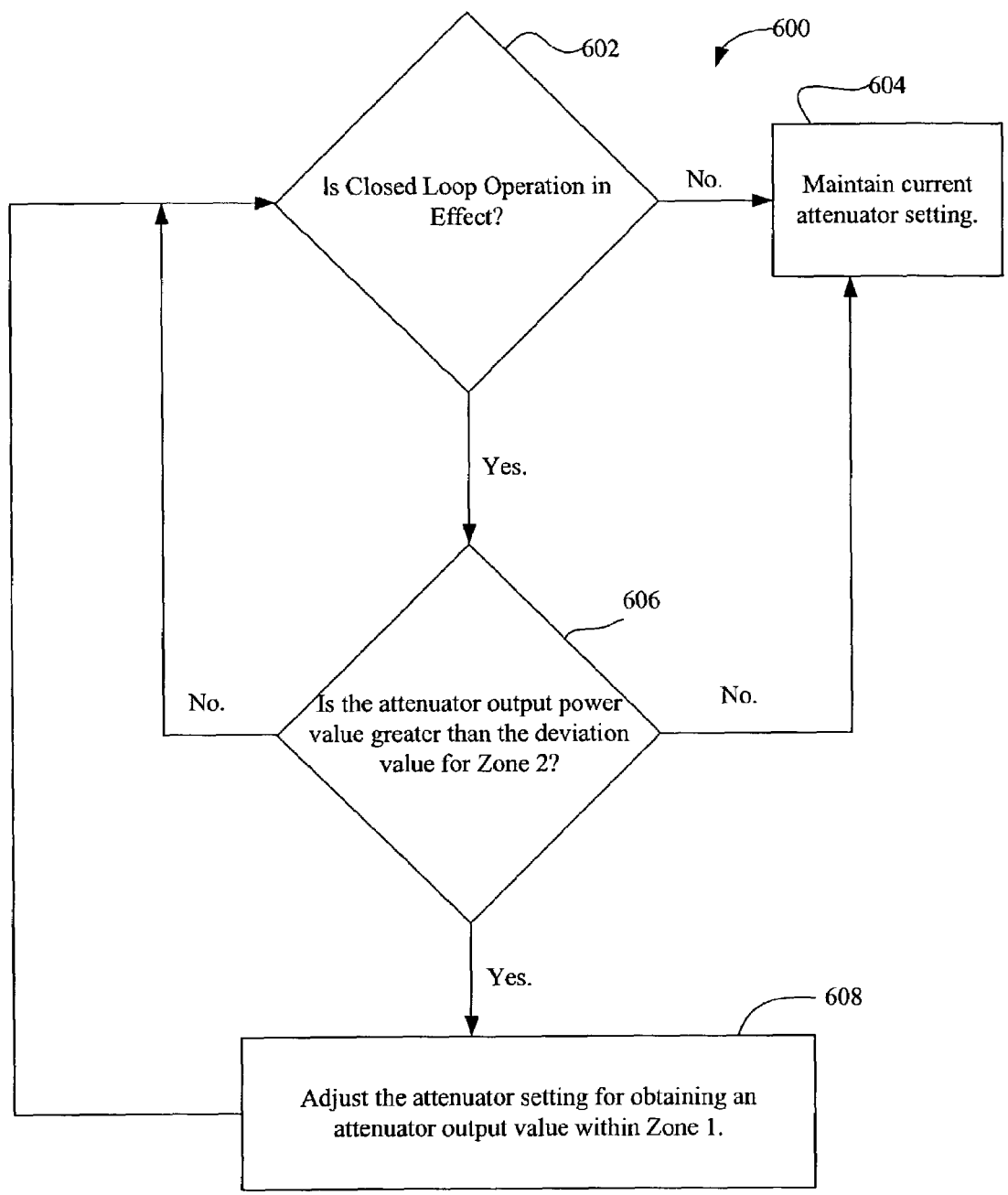
FIG. 6 illustrates a method for managing power in an optical network in accordance with an embodiment of the invention.

FIG. 6 illustrates a method 600 for managing power in an optical network in accordance with an embodiment of the invention. It is determined 602 whether closed loop operation is in effect. For example, a flag to indicate closed or open loop operation is set by the control logic and stored in memory 403. If not in closed loop operation, the current attenuator setting is maintained 604. Otherwise, it is determined 606 whether the attenuator output power value is greater than the deviation value for zone 2. As illustrated in FIG. 5, zone 2 has a larger deviation value from the target attenuation value, in this example, a target output power value, than the deviation value of zone 1 in FIG. 5. If the current attenuator output power value is within the deviation value of zone 2 from the target output power value, the current attenuator setting is maintained 604. For example, the motor is not stepped. If the value is greater than the deviation value for zone 2, the attenuator setting is adjusted 608 for obtaining an attenuator output value within the smaller deviation value for the narrower zone 1 of the target output power. For example in the context of the embodiment of FIG. 4, as long as the potentiometer wiper voltage indicates the limits have not been reached, the direction of movement for adjusting the attenuation is determined, and the control signals 408 are sent from the control unit 402 to the motor 412. The control signals may include an enable bit to activate operation of the motor 412. The motor steps accordingly, and the output power value is detected by the feedback monitoring unit 430. Step adjustment continues as long as the wiper voltage limits are not exceeded and the output power value is outside zone 2. In other embodiments, more than two zones and/or asymmetrical zones may be used.

One or more embodiments of the method may be embodied in instructions in software, hardware, firmware or a combination of one or more of these and be stored in a computer usable medium. An example of a computer usable medium is a memory (e.g. 403).

The foregoing discussion discloses and describes examples of methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

The invention claimed is:

1. A system for managing power in an optical network comprising:
    a variable optical attenuator having an input and an output, the attenuator attenuating one or more optical signals based on a target attenuation value;
    a feedback monitoring unit coupled to the output of the attenuator for monitoring an output attenuation value; and
    a control unit communicatively coupled to the feedback monitoring unit for receiving the output attenuation value, the control unit also being communicatively coupled to the attenuator for controlling the attenuator in accordance with a plurality zone method based upon the output attenuation value and the target attenuation value, and the control unit comprising a control logic, a memory, and an analog to digital converter, and the memory comprising one or more attenuation value lookup table;
    wherein the plurality zone method comprises a first zone comprising a plurality of acceptable output attenuation values within a second zone, the attenuator selectively disabled when the output attenuation value falls within the first zone and selectively enabled when the output attenuation value falls outside of the second zone;

wherein each zone comprises an upper boundary value and a lower boundary value, each boundary value set based upon a balancing of optimization criteria consisting of: accuracy required by a system link budget, longevity of the variable optical attenuator, and the heat dissipated by the variable optical attenuator; and wherein each zone is shifted higher or lower according to a change in the target attenuation value.

2. The system of claim 1 wherein the variable optical attenuator is a variable optical attenuator having moving parts.

3. The system of claim 1 wherein the variable optical attenuator is a latching variable optical attenuator.

4. The system of claim 2 wherein the variable optical attenuator having moving parts is a latching variable optical attenuator.

5. The system of claim 1 further comprising a second feedback monitoring unit coupled to the input of the attenuator for monitoring an input value of the one or more optical signals; and the control unit being communicatively coupled to the second feedback monitoring unit for receiving the input value.

6. The system of claim 5 wherein the control unit determines a target attenuation value based on the input value.

7. The system of claim 1 wherein the variable optical attenuator comprises an optical attenuation element; and an attenuation adjustment unit communicatively coupled to the control unit for receiving one or more control signals for controlling the optical attenuation element for providing a target attenuation value.

8. The system of claim 7 further comprises an attenuation setting detector communicatively coupled to the control unit for indicating a setting of the optical attenuation element.

9. The system of claim 8 wherein the attenuation adjustment unit is a stepper motor.

10. The system of claim 8 wherein the attenuation adjustment unit comprises a micro-electromechanical device controlled by one or more control signals from the control unit.

11. The system of claim 8 wherein the optical attenuation element is a neutral density filter.

12. The system of claim 8 wherein the attenuation adjustment unit is an electric motor.

13. The system of claim 8 wherein the optical attenuation element is a shutter.

14. The system of claim 8 wherein the optical attenuation element is a blocking armature.

15. The system of claim 8 wherein the optical attenuation element is an aperture.

16. The system of claim 8 wherein the attenuation adjustment unit bends a fiber for attenuation.

17. The system of claim 8 wherein the optical attenuation element is a graded index filter.

18. The system of claim 8 wherein the optical attenuation element is a mirror.

19. The system of claim 8 wherein the attenuation adjustment unit is a linear motor.

20. The system of claim 1 wherein the feedback monitoring unit comprises:

a tap coupler for coupling a portion of the one or more optical signals; and a power detector for receiving the coupled portion from the tap coupler and converting the portion to an electrical signal.

21. The system of claim 20 wherein the control unit comprises:

an analog to digital converter for receiving the electrical signal from the power detector and converting the electrical signal to a digital signal;

control logic for receiving the digital signal and for adjusting an attenuation setting of the variable optical attenuator in accordance with a plurality zone method based upon the output attenuation value represented by the digital signal and the target attenuation value; and a memory accessible by the control logic for storing attenuation settings.

22. The system of claim 1 wherein the control unit comprises logic for determining whether the output attenuation value is greater than a first deviation value from a target attenuation value.

23. The system of claim 22 wherein the control unit comprises logic for adjusting an attenuation setting of the attenuator for achieving an output attenuation value that is less than or equal to a second deviation value from the target attenuation value responsive to the output attenuation value being greater than the first deviation value, the second deviation value being less than the first deviation value.

24. An optical network comprising nodes, at least one of the nodes having a system for managing power in an optical network, the system comprising:

a variable optical attenuator having an input and an output, the attenuator attenuating one or more optical signals based on a target attenuation value;

a feedback monitoring unit coupled to the output of the attenuator for monitoring an output attenuation value; and a control unit communicatively coupled to the feedback monitoring unit for receiving the output attenuation value, the control unit also being communicatively coupled to the attenuator for controlling the attenuator in accordance with a plurality zone method based upon the output attenuation value and the target attenuation value, and the control unit comprising a control logic, a memory, and an analog to digital converter, and the memory comprising one or more attenuation value lookup table;

wherein the plurality zone method comprises a first zone comprising a plurality of acceptable output attenuation values within a second zone, the attenuator selectively disabled when the output attenuation value falls within the first zone and selectively enabled when the output attenuation value falls outside of the second zone;

wherein each zone comprises an upper boundary value and a lower boundary value, each boundary value set based upon a balancing of optimization criteria consisting of: accuracy required by a system link budget, longevity of the variable optical attenuator, and the heat dissipated by the variable optical attenuator; and wherein each zone is shifted higher or lower according to a change in the target attenuation value.

25. A method for managing power in an optical network comprising:

determining whether an output attenuation value is greater than a first deviation value from a target attenuation value;

responsive to the output attenuation value being greater than the first deviation value, adjusting an attenuation setting of the attenuator for achieving an output attenuation value that is less than or equal to a second deviation value from the target attenuation value, the second deviation value being less than the first deviation value; and upon achieving the output attenuation value that is less than or equal to the second deviation value from the target attenuation value, selectively disabling the attenuation setting;

wherein the first deviation value and the second deviation value are set based upon a balancing of optimization criteria consisting of: accuracy required by a system link budget, longevity of a variable optical attenuator, and heat dissipated by the variable optical attenuator; and wherein the first deviation value and the second deviation value are shifted higher or lower according to a change in the target attenuation value.

26. A computer usable medium comprising instructions which when executed by control logic cause the control logic to perform a method for managing power in an optical network comprising:

determining whether an output attenuation value is greater than a first deviation value from a target attenuation value;

responsive to the output attenuation value being greater than the first deviation value, adjusting an attenuation setting of the attenuator for achieving an output attenuation value that is less than or equal to a second deviation value from the target attenuation value, the second deviation value being less than the first deviation value; and upon achieving the output attenuation value that is less than or equal to the second deviation value from the target attenuation value, selectively disabling the attenuation setting;

wherein the first deviation value and the second deviation value are set based upon a balancing of optimization criteria consisting of: accuracy required by a system link budget, longevity of a variable optical attenuator, and heat dissipated by the variable optical attenuator; and wherein the first deviation value and the second deviation value are shifted higher or lower according to a change in the target attenuation value.

27. A system for managing power in an optical network comprising:

means for determining whether an output attenuation value is greater than a first deviation value from a target attenuation value;

means for, responsive to the output attenuation value being greater than the first deviation value, adjusting an attenuation setting of the attenuator for achieving an output attenuation value that is less than or equal to a second deviation value from the target attenuation value, the second deviation value being less than the first deviation value; and means for, upon achieving the output attenuation value that is less than or equal to the second deviation value from the target attenuation value, selectively disabling the attenuation setting;

wherein the first deviation value and the second deviation value are set based upon a balancing of optimization criteria consisting of: accuracy required by a system link budget, longevity of a variable optical attenuator, and heat dissipated by the variable optical attenuator; and wherein the first deviation value and the second deviation value are shifted higher or lower according to a change in the target attenuation value.

* * * * *